United States Patent
Saito et al.

(10) Patent No.: US 6,907,857 B2
(45) Date of Patent: Jun. 21, 2005

(54) FUEL SUPPLY AND INJECTION SYSTEM AND METHOD FOR CONTROLLING THE SAME

(75) Inventors: Kimitaka Saito, Nagoya (JP); Yasuhide Tani, Nagoya (JP); Yukio Mori, Nagoya (JP); Shinji Ueda, Anjo (JP); Yutaka Niwa, Nagoya (JP)

(73) Assignee: Denso Corporation, Kariya (JP)

( * ) Notice: Subject to any disclaimer, the term of this patent is extended or adjusted under 35 U.S.C. 154(b) by 44 days.

(21) Appl. No.: 10/285,580

(22) Filed: Nov. 1, 2002

(65) Prior Publication Data

US 2003/0098009 A1 May 29, 2003

(30) Foreign Application Priority Data

Nov. 26, 2001 (JP) ........................................ 2001-359936

(51) Int. Cl.[7] .............................. F02M 51/06; F02B 3/04
(52) U.S. Cl. .................. 123/299; 123/179.16; 123/305; 123/310; 123/491; 123/497
(58) Field of Search ................................ 123/295, 299, 123/305, 310, 491, 497, 179.16

(56) References Cited

U.S. PATENT DOCUMENTS

| 4,733,643 | A | * | 3/1988 | Ishida ........................ 123/299 |
|---|---|---|---|---|
| 4,899,699 | A | * | 2/1990 | Huang et al. ................ 123/305 |
| 4,958,604 | A |   | 9/1990 | Hashimoto |
| 5,085,193 | A | * | 2/1992 | Morikawa .................... 123/497 |
| 5,222,481 | A | * | 6/1993 | Morikawa .................... 123/435 |
| 5,339,785 | A | * | 8/1994 | Wilksch ...................... 123/497 |
| 5,603,303 | A |   | 2/1997 | Okajima et al. ............. 123/508 |
| 6,016,791 | A | * | 1/2000 | Thomas et al. .............. 123/497 |
| 6,101,999 | A | * | 8/2000 | Ohashi et al. ............... 123/295 |
| 6,112,716 | A | * | 9/2000 | Tachibana .................... 123/305 |
| 6,250,287 | B1 | * | 6/2001 | Wickman et al. ........... 123/497 |
| 6,253,546 | B1 | * | 7/2001 | Sun et al. .................... 123/295 |
| 6,257,207 | B1 | * | 7/2001 | Inui et al. .................... 123/491 |
| 6,276,340 | B1 | * | 8/2001 | Kato ............................ 123/491 |
| 6,484,691 | B1 | * | 11/2002 | Schuster et al. ............. 123/305 |
| 6,675,766 | B2 | * | 1/2004 | Miyajima et al. ........... 123/295 |
| 2001/0042801 | A1 |   | 11/2001 | Shouji et al. |
| 2003/0217721 | A1 | * | 11/2003 | Adams et al. .......... 123/179.16 |

FOREIGN PATENT DOCUMENTS

WO     WO 9932782     7/1999

* cited by examiner

*Primary Examiner*—Tony M. Argenbright
(74) *Attorney, Agent, or Firm*—Nixon & Vanderhye P.C.

(57) ABSTRACT

A fuel supply and injection system includes a fuel tank, a single electric pump unit, a plurality of fuel injection valves and a piping arrangement. The pump unit is provided in the fuel tank and includes an inlet for taking the fuel in the fuel tank and an outlet for discharging the fuel. The injection valves are secured to an engine main body. Each fuel injection valve includes a nozzle, which is disposed in a corresponding one of combustion chambers and injects the fuel supplied from the pump unit directly into the corresponding one of the combustion chambers. The piping arrangement connects between the electric pump unit and each fuel injection valve. The pump unit is the only pump for supplying the fuel to the fuel injection valves.

53 Claims, 10 Drawing Sheets

FUEL SUPPLY AND INJECTION SYSTEM AND METHOD FOR CONTROLLING THE SAME

CROSS REFERENCE TO RELATED APPLICATION

This application is based on and incorporates herein by reference Japanese Patent Application No. 2001-359936 filed on Nov. 26, 2001.

BACKGROUND OF THE INVENTION

1. Field of the Invention

The present invention relates to a fuel supply and injection system in a vehicle for supplying fuel to fuel injection valves from a fuel tank by an electric pump unit and injecting the fuel into combustion chambers of an engine main body of an engine through the fuel injection valves. The present invention also relates to a method for controlling such a system.

2. Description of Related Art

A spark ignition internal combustion engine (generally known as a gasoline direct injection engine and hereinafter referred to as direct injection engine) has been known as one type of internal combustion engine for a vehicle. As shown in FIG. 15, the direct injection engine has a plurality of fuel injection valves 102 for directly injecting fuel into respective combustion chambers (cylinder bores) 101 of an engine main body 100. The direct injection engine is advantageous over a conventional type of engine, in which fuel is injected into an intake pipe, for the following reasons. That is, since the fuel is not injected into the intake pipe, the direct injection engine shows quicker response. Also, due to cooling effect exerted in each cylinder, the amount of intake air is increased to increase the engine power, and abnormal combustion, such as knocking, is less likely to occur.

Fuel within a fuel tank 105 is supplied to the respective fuel injection valves 102 by two fuel pumps 106, 108 and two (first and second) fuel lines 110, 111. Of the two fuel pumps, the fuel pump 106 is an electric pump (generally known as a feed pump), which is provided inside the fuel tank 105 and generates a relatively low pump pressure. The other fuel pump 108 is a mechanical pump, which is provided to the engine main body and generates a relatively high pump pressure. The electric pump 106 and the mechanical pump 108 are connected to each other through the first fuel line 110.

More specifically, the electric pump 106 pumps the fuel from the fuel tank 105 to the first fuel line 110 at a relatively low pressure (from 0.3 to 0.5 MPa). The fuel pressure between the electric pump 106 and the mechanical pump 108 is relatively low, so that the first fuel line 110, which connects between the two pumps 106, 108, does not have to withstand a relatively high pressure, and therefore, can be made of rubber. The mechanical pump 108 is driven by rotation of the engine and pressurizes the fuel, which has been pumped by the electric pump 106 at the relatively low pressure, to a relatively high pressure (from 5 to 14 MPa) to pump the pressurized fuel to the second fuel line 111. A metal pipe is used to form the second fuel line 111 because it has to withstand the relatively high pressure. The fuel pressurized by the mechanical pump 108 is branched by a delivery line 112 and is supplied to the respective fuel injection valves 102 provided to the corresponding combustion chambers (cylinders).

Opening and closing of each fuel injection valve 102 is controlled by an ECU 115. The ECU 115 computes an amount of fuel (fuel injection amount) that needs to be injected based on a fuel pressure value measured with a fuel pressure sensor 116, an intake pressure sensor, an air-fuel ratio sensor (the latter two are not shown), etc. Accordingly, the pressurized fuel is injected into the combustion chambers 101 through their respective fuel injection valves 102 based on the fuel injection amount thus computed.

The previously proposed fuel supply and injection system for the direct injection engine uses the electric pump 106 and the mechanical pump 108 as the fuel pumps and uses the relatively high pressure (from 5 to 14 MPa) as the injection pressure.

The above arrangement, however, poses the following disadvantages. Firstly, the use of the electric pump 106 and the mechanical pump 108 results in the relatively complicated structure, which increases the manufacturing and assembling costs. Secondly, the use of the relatively high injection pressure requires the relatively large mechanical pump 108 and a greater driving force for driving the mechanical pump 108 to achieve the relatively high pressure. Thirdly, it is difficult to maintain a required fuel injection amount and a required level of fuel atomization at the engine start-up.

More specifically with respect to the third disadvantage, the mechanical pump 108 cannot pressurize the fuel as high as 5 to 14 MPa while the engine speed is relatively low at the engine start-up (the fuel is pressurized to 0.2 to 0.5 MPa at most by the electric pump 106), and only the fuel at the relatively low pressure is supplied to the fuel injection valves 102. On the other hand, each fuel injection valve 102 is designed to ensure a required level of fuel atomization and a required fuel injection amount only at the desired predetermined fuel pressure (from 5 to 14 MPa). Hence, when the fuel pressure is lower than the predetermined pressure, that is, when the fuel pressure is in a range of (0.2 to 0.5 MPa)/(5 to 14 MPa)=1/10 to 1/70, atomization of the fuel injected into the corresponding cylinder becomes insufficient, and also a fuel injection amount becomes insufficient. This causes the following disadvantages. That is, a level of combustion of the fuel at the engine start-up is lowered. Also, time required for the engine start-up is lengthened. Furthermore, emissions of harmful gas, such as smoke and HC, are increased.

SUMMARY OF THE INVENTION

The present invention addresses the above disadvantages. Thus, it is an objective of the present invention to provide a fuel supply and injection system of a relatively simple structure that can be produced at relatively low costs and achieve suitable injection for providing a required fuel injection amount and a required level of fuel atomization even at the engine start-up. It is another objective of the present invention to provide a method for controlling such a system.

To achieve the objectives of the present invention, there is provided a fuel supply and injection system for an engine of a vehicle. The engine has an engine main body, which includes a plurality of cylinder bores and a plurality of pistons. Each piston is received in a corresponding one of the cylinder bores and defines a combustion chamber in the corresponding one of the cylinder bores. The fuel supply and injection system includes a fuel tank, a single electric pump unit, a plurality of fuel injection valves and a piping arrangement. The fuel tank receives fuel. The single electric pump unit is provided in the fuel tank and includes an inlet for taking the fuel in the fuel tank and an outlet for discharging the fuel. The plurality of fuel injection valves are secured to the engine main body. Each fuel injection valve includes a nozzle, which is disposed in a corresponding one of the combustion chambers and injects the fuel supplied from the electric pump unit directly into the corresponding one of the combustion chambers. The piping arrangement connects between the outlet of the electric pump unit and each fuel injection valve. The single electric pump unit is the only pump for supplying the fuel to the fuel injection valves.

To achieve the objectives of the present invention, there is provided a method for controlling a fuel supply and injection system for an engine of a vehicle. In the method, electric power is supplied from a battery of the vehicle to an electric pump unit at time of start-up of the engine to drive the electric pump unit for pumping fuel from a fuel tank to a plurality of injection valves through a piping arrangement. Thereafter, electric power is supplied from the battery to a starter to drive the starter for starting the engine.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings.

(Overall Arrangement and Operation)

Figure 1:
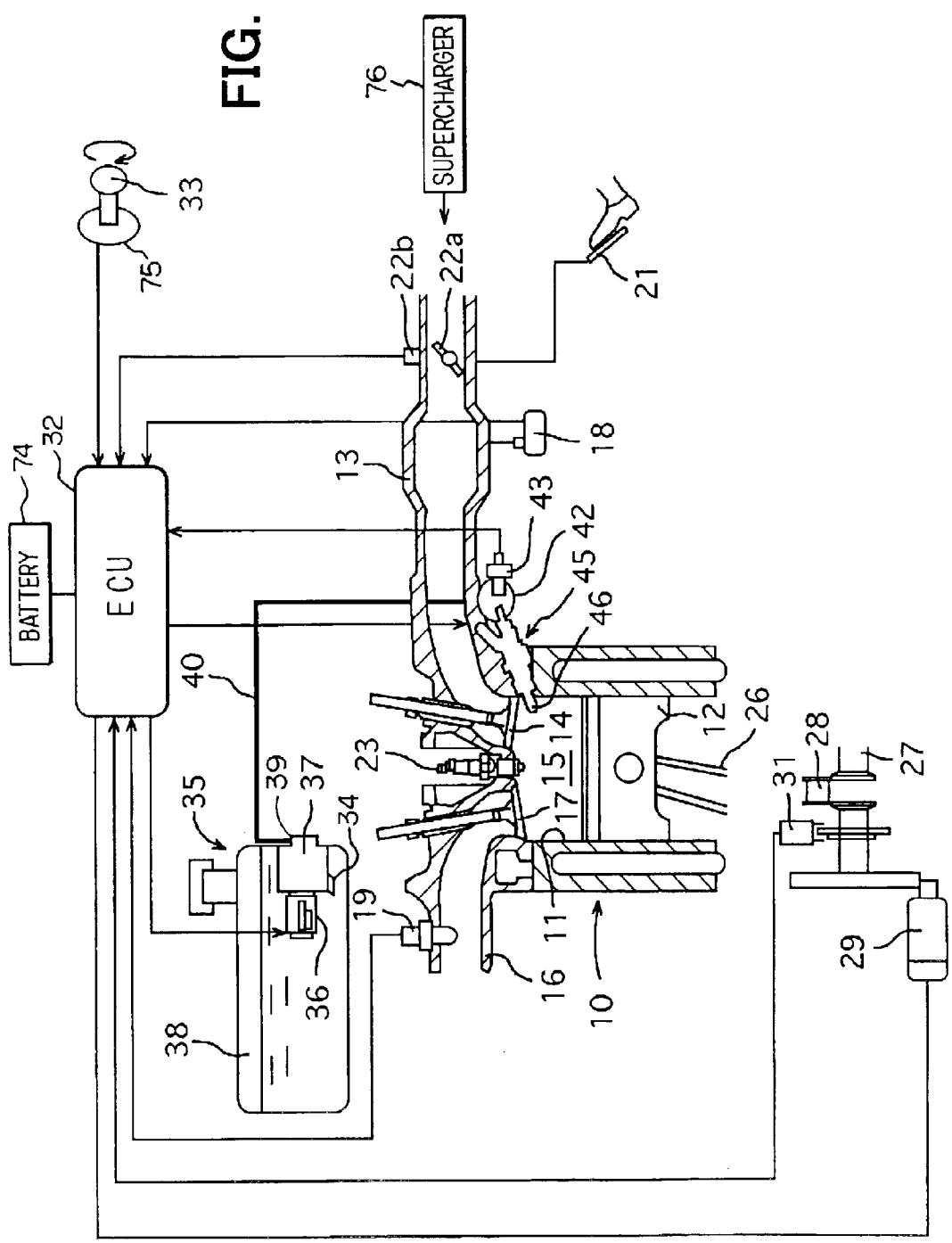
FIG. 1 is a schematic view of a fuel supply and injection system according to an embodiment of the invention.

FIG. 1 shows a four cylinder direct injection engine and a fuel supply and injection system. An engine main body (cylinder block) 10 of the direct injection engine is provided with four (only one is shown) cylinder bores 11, and a piston 12 is slidably received in each cylinder bore 11. Each cylinder bore 11 is connected to an intake pipe 13 and to an exhaust pipe 16. An intake valve 14 is provided in an opening of the intake pipe 13. An exhaust valve 17 is provided in an opening of the exhaust pipe 16. An intake pressure sensor 18 is arranged in the intake pipe 13, and an air-fuel ratio sensor 19 is arranged in the exhaust pipe 16. A throttle valve 22a is provided in the middle of the intake pipe 13. A throttle valve position sensor 22b detects a position of the throttle valve 22a that varies in response to a position of an accelerator pedal 21. Each ignition plug 23 is secured to the top portion of the engine main body 10.

One end of a connecting rod 26 is rotatably connected to the piston 12, and the other end of the connecting rod 26 is also rotatably connected to a crank 28, which is secured to a crankshaft 27. The crankshaft 27 is driven by a starter 29, and a crank angle sensor 31 detects the rotation of the crankshaft 27.

Signals from the intake pressure sensor 18, the air-fuel ratio sensor 19, the throttle valve position sensor 22b, and the crank angle sensor 31 are fed to an ECU 32.

Next, the fuel supply and injection system will be described with reference to FIGS. 1–4C. The fuel supply and injection system includes an electric pump unit 35, a fuel line 40, a delivery line 42 and fuel injection valves 45. The fuel line 40 and the delivery line 42 constitute part of a piping arrangement.

Figure 2:
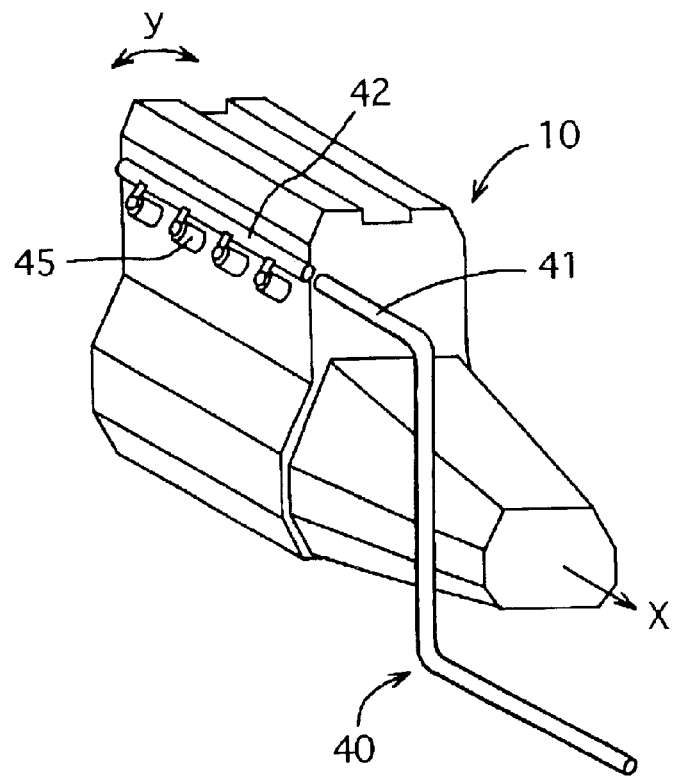
FIG. 2 is a perspective view showing an engine main body, fuel injection valves, a delivery line and a fuel line according to the embodiment.
Figure 3:
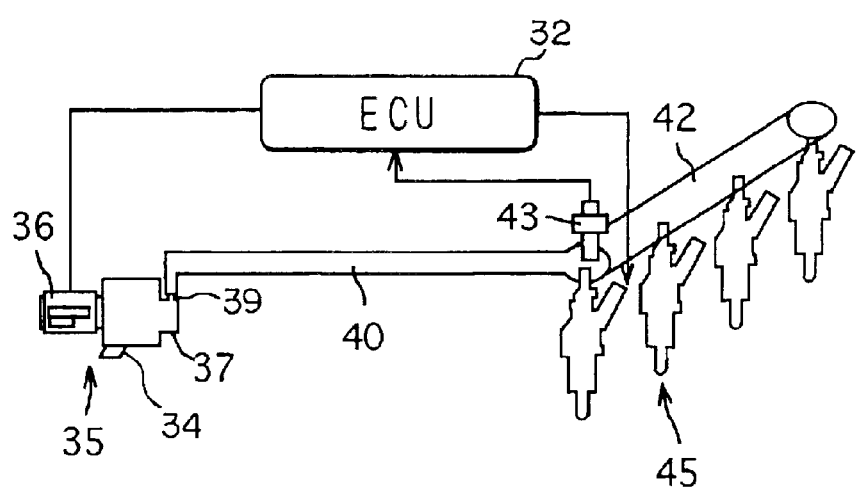
FIG. 3 is a schematic view showing the fuel injection valves, the delivery line, the fuel line, an electric pump unit and an ECU according to the present embodiment.

As shown in FIG. 1, the electric pump unit 35 includes one electric motor 36 and one fuel pump 37, which is driven by the electric motor 36. The electric pump unit 35 is received in the fuel tank 38. The electric pump unit 35 generates a pressure (herein, approximately 2 MPa) several times higher than a pressure generated by the previously proposed electric pump. The fuel line 40 made of metal extends from an outlet 39 of the fuel pump 37 to the engine main body 10 and is connected to the delivery line 42. The delivery line 42 is also made of metal. As shown in FIG. 2, the delivery line 42 is connected to a lateral side portion of the engine main body 10 such that the delivery line 42 extends parallel to an axial direction (X direction in FIG. 2) of the output shaft of the engine main body 10 to supply fuel to the four fuel injection valves 45 described below. As shown in FIG. 3, a signal from a fuel pressure sensor 43 provided in the delivery line 42 is inputted to the ECU 32.

Each fuel injection valve 45 is secured to the lateral side portion of the engine main body 10 in close proximity to the intake pipe 13 and extends in an oblique direction relative to an axial direction of a corresponding one the cylinder bores 11. A nozzle 46, which is provided at a distal end of each fuel injection valve 45, is disposed within the corresponding combustion chamber 15.

Figure 4A:
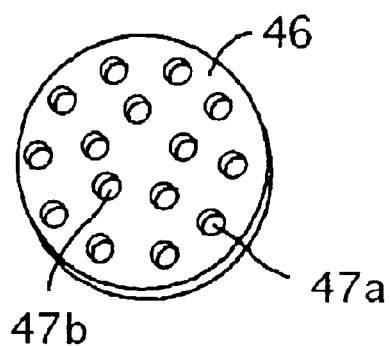
FIG. 4A is an enlarged front view showing injection holes of an injection nozzle of the fuel injection valve.

As shown in FIG. 4A, the nozzle 46 includes fifteen circular injection holes 47a, 47b. Among the injection holes 47a, 47b, ten injection holes 47a are arranged along a larger circle at generally equal intervals, and five injection holes 47b are arranged along a smaller circle at generally equal intervals. Both the five injection holes 47b along the smaller circle and the ten injection holes 47a along the larger circle are oriented radially outwardly from the center of the nozzle 46.

Referring to FIG. 1 again, the rotational speed of the electric motor 36 and the timing and degree of opening/closing of each fuel injection valve 45 are controlled by signals from the ECU 32.

While the engine is running, the electric pump unit 35 takes fuel from the fuel tank 38 through an inlet 34 of the electric pump unit 35 and pressurizes the fuel. Then, the electric pump unit 35 pumps the fuel to the fuel injection valves 45 through the outlet 39, the fuel line 40 and the delivery line 42. The fuel injection valves 45 are opened/closed based on a command from the ECU 32. In other words, the ECU 32 computes a fuel injection amount that needs to be supplied to the corresponding combustion chamber 15 based on the measured values of the throttle valve position sensor 22b, the intake pressure sensor 18, the crank angle sensor 31, the air-fuel ratio sensor 19 and/or the like. The ECU 32 controls the opening/closing of the fuel injection valves 45 based on the computed fuel injection amount. Thus, the pressurized fuel is injected into the combustion chamber 15 through the fuel injection valve 45 and is mixed with air supplied through the intake pipe 13 at a predetermined ratio. The resulting gas mixture of the fuel and air is compressed by the piston 12, and during this compression stroke, the ignition plug 23 ignites the fuel to combust the fuel.

(Arrangement and Operation of Each Component)

Figure 15:
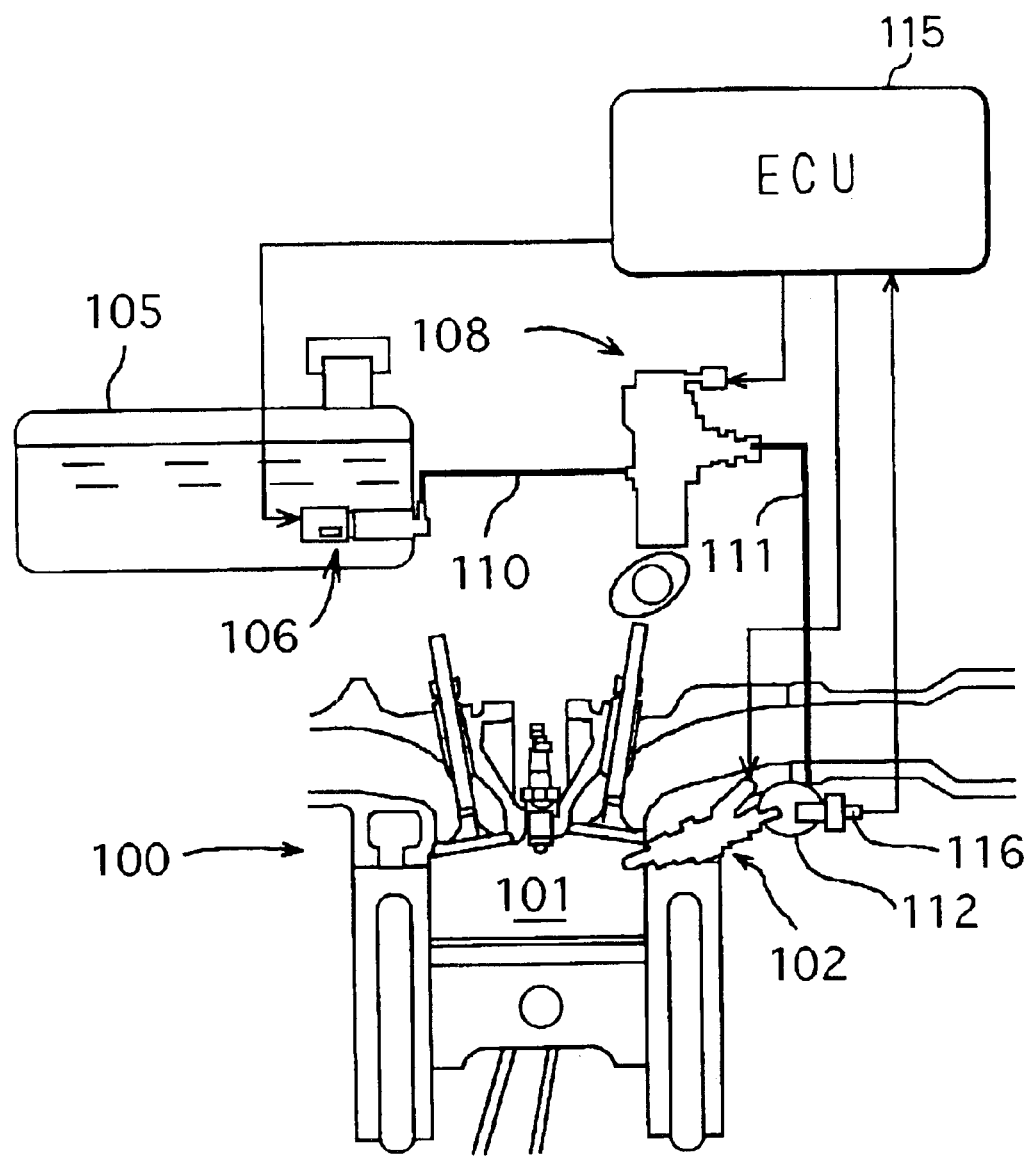
FIG. 15 is a schematic view showing a major portion of a previously proposed fuel supply and injection system.

As shown in FIG. 1, the electric pump unit 35 is the only electric pump unit provided between the fuel tank 38 and the fuel injection valves 45. That is, the mechanical pump 108 (FIG. 15) used in the previously proposed system is eliminated in this embodiment. This arrangement allows reduction of the manufacturing costs of the fuel supply and injection system and also allows simplification of the fuel supply and injection system. Also, loss of the power, which is used to drive the previously proposed mechanical pump, is eliminated in this embodiment, so that it is possible to increase the output power of the engine and reduce fuel consumption of the engine.

The pressurized fuel pumped by the electric pump unit 35 is injected into each fuel chamber 15 through the corresponding fuel injection valve 45. As described above, in the present embodiment, the fuel pressure (2 MPa) of the direct injection engine is set lower than the previously proposed fuel pressure (from 5 to 14 MPa). When the fuel pressure is low, the particle size of the injected fuel becomes larger, which may result in insufficient mixing of the fuel and air taken through the intake pipe 13.

Figure 4B:
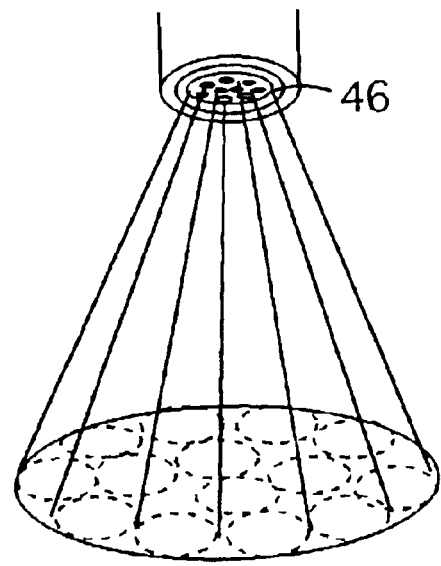
FIG. 4B is an enlarged schematic perspective view showing injection of fuel through the injection holes of the injection nozzle.
Figure 4C:
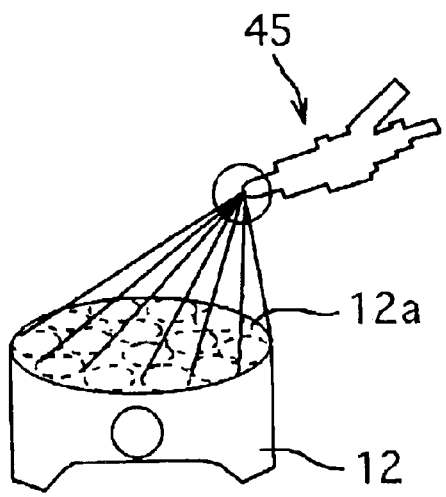
FIG. 4C is a schematic view showing the injection of the fuel through the injection holes.

In consideration of this inconvenience, as shown in FIG. 4A, the fifteen fuel injection holes 47a, 47b are provided in the nozzle 46 of each fuel injection valve 45 at the predetermined positions. Each fuel injection hole 47a, 47b extends in an oblique direction with respect to an axial direction of the fuel injection valve 45. Hence, as shown in FIGS. 4B and 4C, the fuel is injected radially through the respective injection holes 47a, 47b and is distributed throughout the combustion chamber 15, i.e., over the top surface 12a of the piston 12. Hence, even when the fuel pressure is as low as 2 MPa, an increase in the size of fuel particle and insufficient mixing of the fuel with the air can be advantageously restrained.

Next, the fuel injection at the engine start-up will be described. At the engine start-up of a vehicle, the engine is forcedly rotated by the starter 29 until the engine starts to rotate by itself through the combustion. The starter 29 needs a relatively large electric power when the starter 29 rotates the engine. Because of this, both the electric motor 36 in the electric pump unit 35 and the starter 29 are controlled relative to each other.

Figure 5:
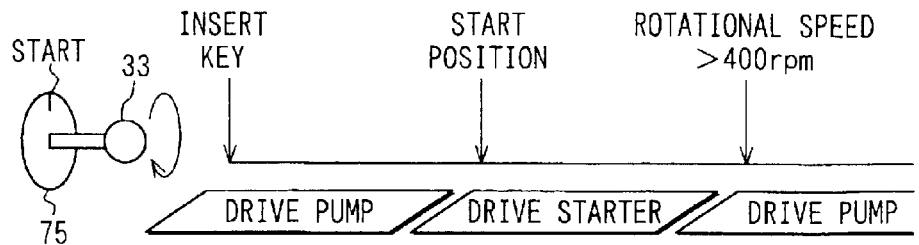
FIG. 5 is a schematic view showing control operation of the electric pump unit and a starter.

More specifically, as shown in FIG. 5, the electric motor 36 is actuated and driven by power from the battery to drive the fuel pump 37 when the ignition key 33 is inserted into an ignition switch 75. Thus, the fuel pump 37 is driven to pressurize and pump the fuel to the fuel injection valves 45 through the fuel line 40 and the delivery line 42. When the ignition key 33 is turned to the start position, driving of the electric motor 36 is halted, and only the starter 29 is driven. Consequently, more power can be supplied to the starter 29 from the battery to increase the rotational force of the starter 29.

The rotational force of the starter 29 can merely cause the engine to rotate at 100 to 200 rpm. However, once the combustion of the fuel starts, and thus the engine generates torque, the rotational speed of the engine increases rapidly. Hence, when the rotational speed of the engine exceeds 400 rpm, the driving of the starter 29 is stopped, and the driving of the electric motor 36 is resumed to drive the fuel pump 37.

As described above, the electric pump unit 35 is driven before the activation of the engine, i.e., the activation of the starter 29. Consequently, a desired fuel pressure can be ensured from the beginning of the engine start-up. Hence, it is possible to inject the fuel of a desired particle size into the combustion chambers 15 through the fuel injection valves 45 at a desired fuel injection amount, thereby making it possible to achieve satisfactory combustion. As a result, the starting time period can be shortened, and also emission of smoke and HC can be reduced. In the previously proposed system, the electric pump 106 (FIG. 15) also supplies the fuel at the engine start-up. However, there is no technical idea to supply the fuel prior to the engine start-up.

Next, damage to the fuel line 40 and the delivery line 42 will be described with reference to FIG. 2. Although the fuel pressure (approximately 2 MPa) at the fuel injection valve 45 is substantially lower than that of the previously proposed system, vibrations of the engine main body 10 could cause rolling of the engine main body 10 in a y-direction in FIG. 2 about the output shaft of the engine main body 10.

In consideration of the foregoing, in the present embodiment, metal pipes that can withstand a relatively high pressure are used to form the fuel line 40 and the delivery line 42. Hence, even when extending and contracting forces are applied to a connecting portion 41, which connects between the fuel line 40 and the delivery line 42, damage to the fuel line 40 and the delivery line 42 can be restrained, and loosening of the connecting portion 41 can be also restrained. However, it should be noted that when the connecting portion 41 is constructed to extend from the lateral side portion of the engine main body 10 in a direction perpendicular to a plane of the lateral side portion of the engine main body 10, the rolling of the engine main body 10 could cause damage to the connecting portion 41.

Next, the control of the fuel pressure at the fuel injection valves 45 will be described with reference to FIG. 3. The electric pump unit 35 is spaced about 2–3 m from the engine main body 10, so that a pressure difference exists between the fuel pressure at the outlet 39 of the fuel pump 36 and the fuel pressure inside the delivery line 42. In the present case where the fuel pressure sensor 43 is arranged in the delivery line 42 to measure the fuel pressure, a response delay occurs when the operating pressure of the fuel pump 37 is increased. Thus, when the operating pressure of the electric pump unit 35 is controlled based on the current fuel pressure of the electric pump unit 35, which is determined directly based on the measurement of the fuel pressure sensor 43, scattering or overshooting of the pressure occurs. As a result, the fuel pressure cannot be accurately controlled.

In consideration of this inconvenience, in the present embodiment, the ECU 32 estimates a fuel pressure at the outlet 39 of the fuel pump 37 based on the measurement of the fuel pressure sensor 43 arranged in the delivery line 42. Then, the ECU 32 controls the rotational speed of the electric motor 36 based on the estimated fuel pressure. The estimation of the fuel pressure at the outlet 39 of the fuel pump 37 is performed using estimated values, which are obtained through simulations of various models that are constructed using the fuel line 40 and the delivery line 42.

In the present embodiment, the estimation of the fuel pressure is required because of the relatively long distance between the single electric pump unit 35 and the engine main body 10. However, it should be noted that the estimation of the fuel pressure is not required, for example, in the previously proposed system where the pressurization of the fuel is mainly carried out by the mechanical pump 108 (FIG. 15) arranged in the engine main body.

Next, electric power for driving the electric motor 36, i.e., electric power for driving the fuel pump 37 will be described with reference to FIG. 6. The ECU 32 computes an optimal fuel injection amount based on an operating state of the engine. Then, the ECU 32 controls each fuel injection valve 45 to inject the computed fuel injection amount. That is, when the fuel is injected, the fuel pressure inside the fuel line 40 drops. Thus, the electric pump unit 35 needs to pump the fuel to the fuel injection valves 45.

Figure 6:
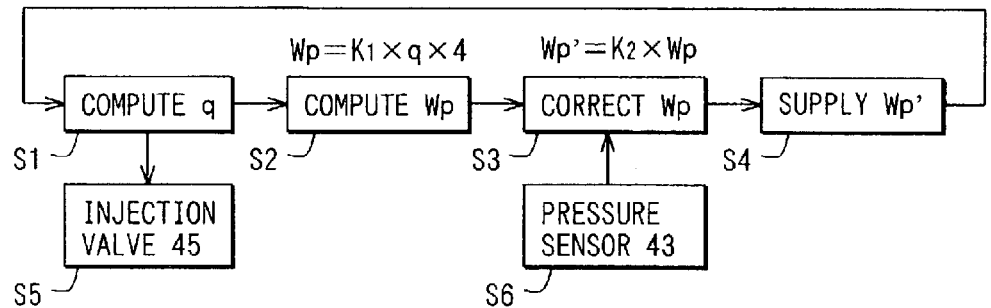
FIG. 6 is a schematic view showing correction of driving power of the electric pump unit.

In consideration of the foregoing, in the present embodiment, as shown in FIG. 6, the pump electric power is controlled based on the fuel injection amount. Specifically, at step S1 in FIG. 6, a fuel injection amount q of each fuel injection valve 45 is determined based on the engine speed measured with the crank angle sensor 31 and/or the throttle valve position sensor 22b. At step S5, a gas mixture of the predetermined fuel injection amount, which is determined at step S1, is injected through the corresponding fuel injection valve 45. At step S2, expected pump electric power Wp is computed. This is accomplished as follows. That is, a total fuel injection amount (q×4) of all of the fuel injection valves 45 is first computed by multiplying the fuel injection amount q, which is determined at step S1, by the number of cylinders, i.e., 4 in this embodiment. Then, the total fuel injection amount (q×4) is multiplied by a coefficient k1 to obtain the expected pump electric power Wp (=k1×q×4). At step S3, a pump electric power correction coefficient k2 is obtained based on the fuel pressure measured with the fuel pressure sensor 43 at step S6. Then, the expected pump electric power Wp is multiplied by the pump electric power correction coefficient k2 to obtain the pump electric power Wp' (=k2×Wp). Then, at step S4, the pump electric power Wp' is supplied to the fuel pump 37 (or to the electric motor 36).

As described above, the pump electric power corresponding to the fuel injection amount is corrected using the measurement of the fuel pressure sensor 43. Then, the corrected pump electric power is supplied to the electric motor 36 to drive the fuel pump 37. As a result, the fuel pump 37 is more precisely controlled, and the responsibility of the fuel pump 37 is improved. It should be noted that this control is made possible with use of the single electric pump unit 35 that increases the fuel pressure, and the same control cannot be achieved by the previously proposed system where the mechanical pump is driven by the rotation of the engine.

Figure 7:
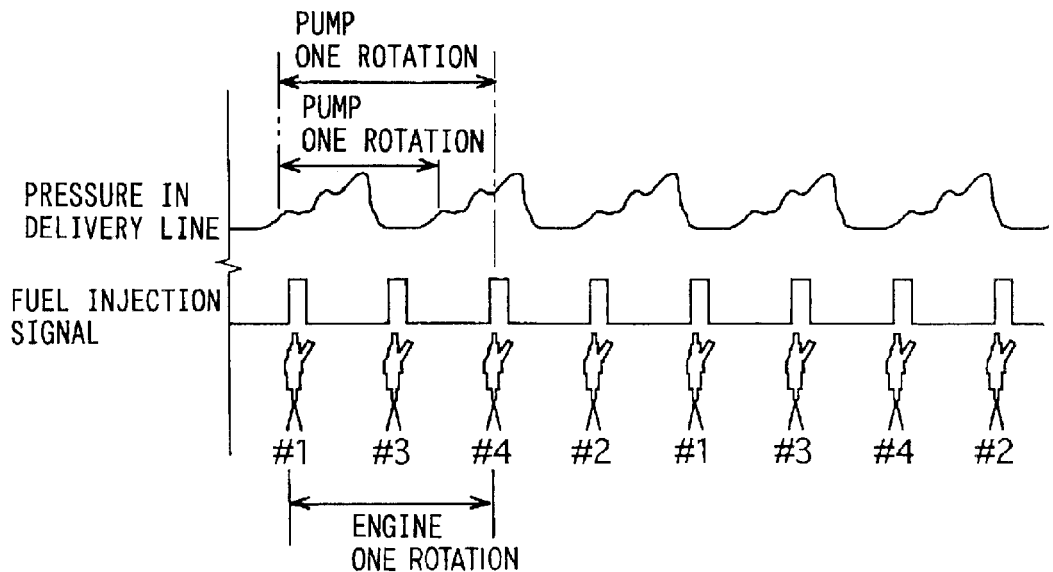
FIG. 7 is a schematic view showing relationship between a fuel pressure inside a delivery line and a fuel injection signal for injecting the fuel to the fuel injection valves.

FIG. 7 shows relationship between the fuel pressure inside the delivery line 42 and a fuel injection signal (fuel injecting timing) supplied to each fuel injection valve 45 (the cycle order of the cylinders is #1, #3, #4 and #2 as shown in FIG. 7). The pressure in the delivery line 42 varies in synchronization with the rotation of the fuel pump 37. The fuel pressure inside the delivery line 42 increases during the pumping stroke of the fuel pump 37. Two of the fuel injection valves 45 inject fuel once per rotation of the engine.

In consideration of the foregoing, in the present embodiment, the ECU 32 adjusts the rotational speed of the electric motor 36, so that the time required for one rotation of the fuel pump 37 is shortened in comparison to the time required for one rotation of the engine, as shown in FIG. 7. Consequently, the rotation of the fuel pump 37 and the rotation of the engine are not synchronized. For this reason, even when the fuel pressure varies, it is still possible to prevent an unwanted event where the fuel injection valve 45 in a given cylinder injects the fuel at a lower or higher pressure than the fuel injection valves 45 in the other cylinders. As a consequence, the gas mixture in the respective cylinders #1, #4, #3 and #2 becomes generally homogeneous. This can restrain a change in torque of the engine and deterioration of emission.

On the contrary, as indcted by chain double-dashed lines in FIG. 7, when the rotation of the electric pump unit 35 and the rotation of the engine are synchronized, it may happen that the fuel injection valve 45 in a given cylinder injects the fuel at a lower or higher pressure than the fuel injection valves 45 in the other cylinders due to the fuel pressure variations. Consequently, for example, the fuel injection valves 45 in the cylinders #1, #4 may inject the fuel at a relatively low pressure, and the fuel injection valves 45 in the cylinders #3, #2 may inject the fuel at a relatively high pressure. Thus, the gas mixture in the combustion chamber 15 of each of the cylinders #1, #4 becomes lean, and the gas mixture in the combustion chamber 15 of each of the cylinders #3, #2 becomes rich.

(Modifications)
(1) Electric Pump Unit

Figure 9A:
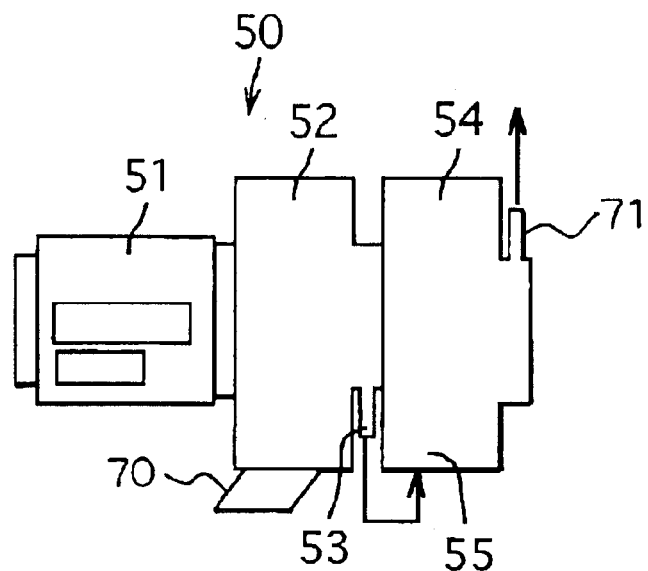
FIG. 9A is a schematic view showing a modification of the electric pump unit.

In a modification shown in FIG. 9A, the electric pump unit 35 is replaced with an electric pump unit 50. The electric pump unit 50 includes one electric motor 51, a first fuel pump 52 and a second fuel pump 54, which are driven by the electric motor 51. An outlet 53 of the first fuel pump 52 is connected to an inlet 55 of the second fuel pump 54. Fuel is taken from the fuel tank 38 through an inlet 70 of the first fuel pump 52 and is discharged from an outlet 71 of the second fuel pump 54 to the fuel line 40. With this arrangement, the electric pump unit 50 can advantageously achieve a higher discharge pressure.

Figure 9B:
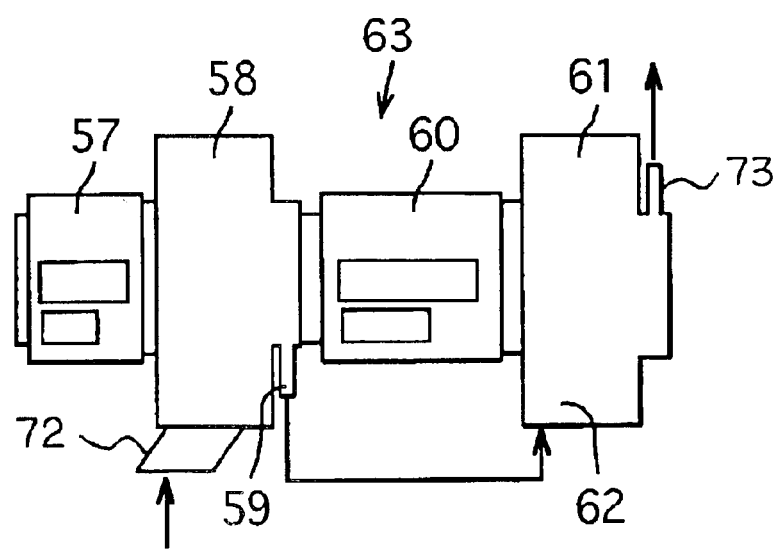
FIG. 9B is a schematic view showing another modification of the electric pump unit.

In another modification shown in FIG. 9B, the electric pump unit 35 is replaced with an electric pump unit 63. The electric pump unit 63 includes a first electric motor 57, a second electric motor 60, a first fuel pump 58 driven by the first electric motor 57, and a second fuel pump 61 driven by the second electric motor 60. An outlet 59 of the first fuel pump 58 is connected to an inlet 62 of the second fuel pump 61. Fuel is taken from the fuel tank 38 through an inlet 72 of the first fuel pump 58 and is discharged from an outlet 73 of the second fuel pump 61 to the fuel line 40. The electric pump unit 63 arranged in this manner can offer the following advantage. That is, the first fuel pump 58 and the second fuel pump 61 can be driven by the most efficient driving torque.

(2) Injection Holes of Nozzle

Figure 10A:
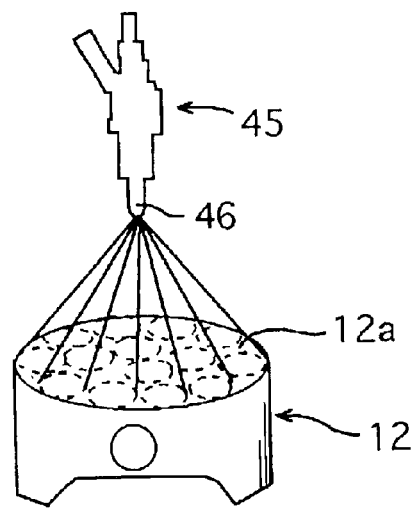
FIG. 10A is a schematic view showing a modification of the nozzle.

In a modification shown in FIG. 10A, each fuel injection valve 45 is secured to the top portion of the engine main body 10, so that each fuel injection valve 45 injects the fuel uniformly throughout the combustion chamber 15 through the injection holes, which are formed in the nozzle 46 of the fuel injection valve 45 to extend generally in the axial direction of the fuel injection valve 45.

Figure 10B:
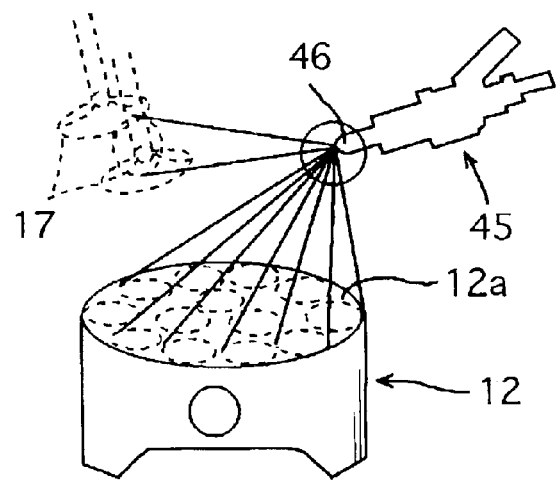
FIG. 10B is a schematic view showing another modification of the nozzle.

In a modification shown in FIG. 10B, the nozzle 46 of each fuel injection valve 45 includes injection holes, through which the fuel is injected uniformly over the top surface 12a of the piston 12, and injection holes, through which the fuel is injected to two exhaust valves 17. Most (for example, eleven holes) of the injection holes used for injecting the fuel over the top surface 12a of the piston 12 are each formed to extend generally in an oblique direction with respect to the axial direction, and the rest (for example, four holes) of the injection holes used for injecting the fuel to the exhaust valves 17 are each formed to extend generally in the axial direction. The exhaust valves 17 are heated higher than any other portion in the combustion chamber 15. Thus evaporation of the fuel is promoted by applying the fuel to the exhaust valves 17, so that satisfactory gas mixture can be provided inside the combustion chamber 15.

Figure 10C:
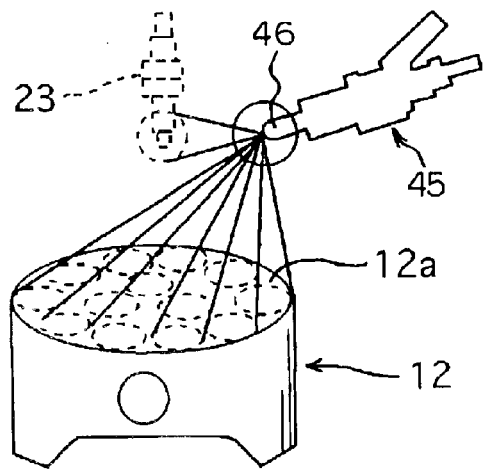
FIG. 10C is a schematic view showing a further modification of the nozzle.

In a modification shown in FIG. 10C, the nozzle 46 of each fuel injection valve 45 includes injection holes, through which the fuel is injected uniformly over the top surface 12a of the piston 12, and injection holes, through which the fuel is injected to the ignition plug 23. Most (for example, thirteen holes) of the injection holes used for injecting the fuel over the top surface 12a of the piston 12 are each formed to extend generally in an oblique direction with respect to the axial direction, and the rest (for example, two holes) of the injection holes used for injecting the fuel to the ignition plug 23 are each formed to extend generally in the axial direction. By producing a rich gas mixture near the ignition plug 23 in this manner, ignitability of the fuel can be further improved.

(3) Delivery Line

Figure 11:
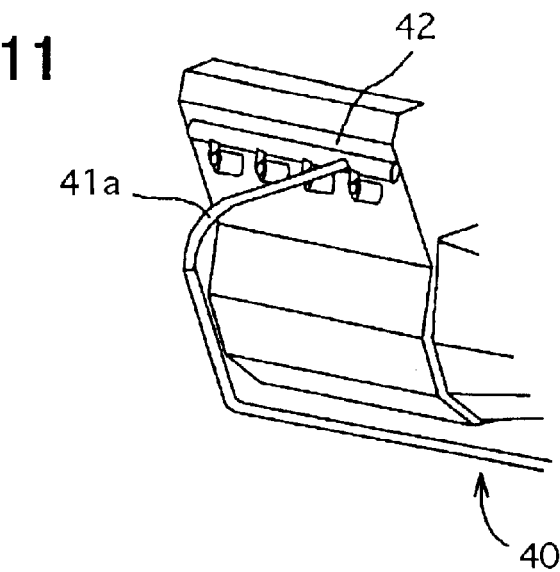
FIG. 11 is a schematic partial view showing a modification of a connecting portion of the delivery line.

In a modification shown in FIG. 11, a connecting portion 41a of the fuel line 40 is formed of a flexible pipe or flexible material (made of wire gauze, rubber, and resin) that can withstand a relatively high pressure and absorb vibrations of the engine. In this case, the connecting portion 41a can be arranged to extend in a direction perpendicular to the output shaft of the engine. However, it should be noted that the connecting portion 41a can be alternatively arranged to extend in a direction parallel to the output shaft of the engine.

(4) Fuel Pressure Sensor

Figure 12A:
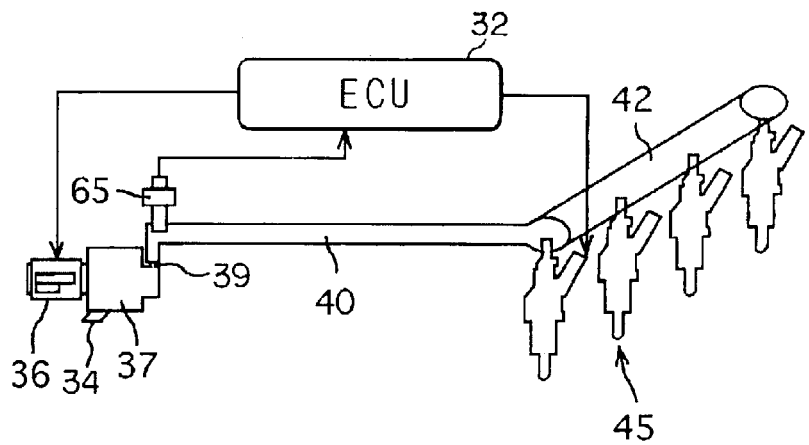
FIG. 12A is a schematic view showing a modification of arrangement of a fuel pressure sensor.

In a modification shown in FIG. 12A, a fuel pressure sensor 65 is arranged adjacent to the outlet of the fuel pump 37. In this case, the set pressure of the fuel pump 37 can be controlled directly based on the measurement of the fuel pressure sensor 65. However, a fuel injection amount, which is determined based on an injecting time period of the fuel injection valve 45 and a pressure in the delivery line 42, cannot be controlled accurately. That is to say, the fuel pressure at the point adjacent to the outlet 39 of the fuel pump 37 differs from the fuel pressure inside the delivery line 42. Thus, determination of an injecting time period based on the measurement of the fuel pressure sensor 65 causes an error in a fuel injection amount.

Therefore, in this case, it is preferable to determine an injecting time period by estimating a pressure in the delivery line 42 based on the measurement of the fuel pressure sensor 65. The estimated pressure in the delivery line 42 can be obtained using a predetermined estimating equation. Alternatively, the estimated pressure in the delivery line 42 can be obtained through simulations of various models that are constructed using the fuel pump 37, the fuel line 40, the delivery line 42 and the fuel injection valves 45.

Figure 12B:
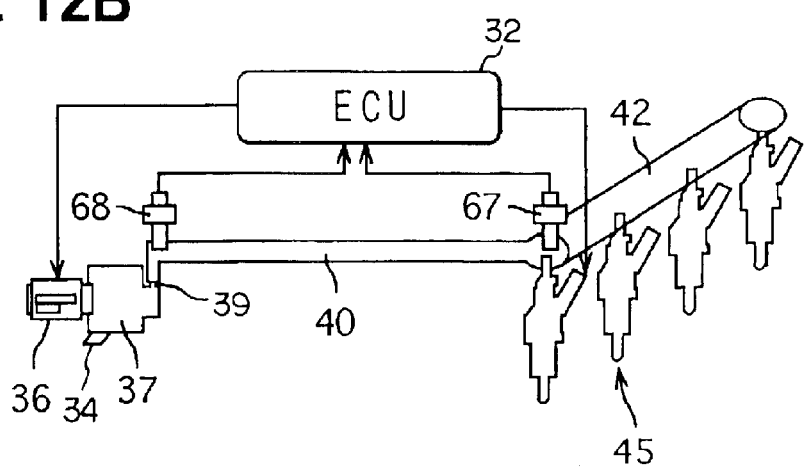
FIG. 12B is a schematic view showing another modification of arrangement of the fuel pressure sensor.

In a modification shown in FIG. 12B, a first fuel pressure sensor 67 is provided in the delivery line 42, and a second fuel pressure sensor 68 is provided adjacent to the outlet 39 of the fuel pump 37. In this case, it is preferred that an injecting time period is determined based on the measurement of the first fuel pressure sensor 67, and the set pressure of the fuel pump 37 is controlled based on the measurement of the second fuel pressure sensor 68.

(5) Collaborated Control at Engine Start-Up

Figure 13A:
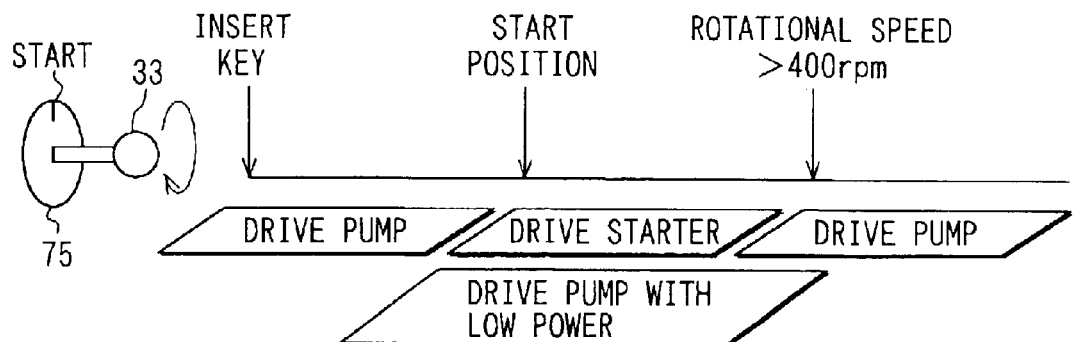
FIG. 13A is a schematic view showing a modification of control operation of the electric pump unit and the starter.

The electric power, which can be supplied from the battery 74 to the starter 29, is limited to a predetermined maximum amount, and this maximum amount varies based on a level of battery charge and the temperature of the battery. When the power needed for driving the starter 29 is less than the predetermined maximum amount, the battery has surplus power. In consideration of the foregoing, in a modification shown in FIG. 13A, when the ignition key 33 is turned to the start position, the electric motor 36 for driving the fuel pump 37 is not stopped completely. Instead of stopping the electric motor 36, the electric motor 36 is kept driven with the surplus electric power remaining in the battery while driving the starter 29. In short, the driving of the starter 29 has priority over the driving of the electric motor 36.

The starter 29 and the electric motor 36 require considerably large electric power in comparison to the other electrical components mounted to a vehicle. A simple sum of the power required by the starter 29 and the power required by the electric motor 36 often exceeds the supply capacity of the battery. Hence, it is effective to control the electric motor 36 and the starter 29 in collaboration at the engine start-up.

Figure 13B:
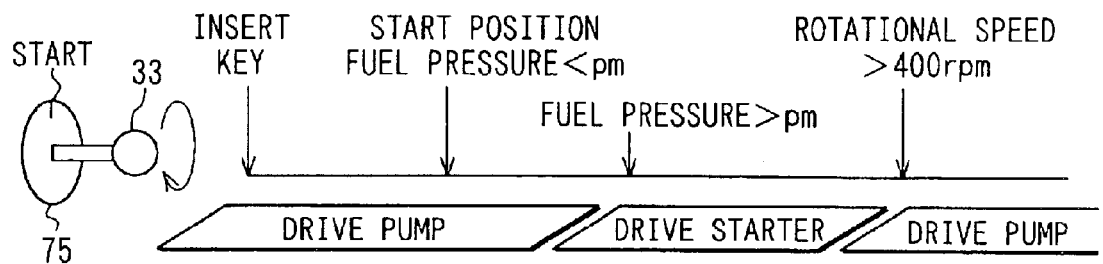
FIG. 13B is a schematic view showing another modification of control operation of the electric pump unit and the starter.

In a modification shown in FIG. 13B, the electric motor 36 for driving the fuel pump 37 is actuated when the ignition key 33 is inserted into the ignition switch 75. In a case where the fuel pressure has not reached a predetermined pressure (Pm) when the ignition key 33 is turned to the start position, the electric motor 36 is kept driven without driving the starter 29. On the contrary, in a case where the fuel pressure has exceeded the predetermined fuel pressure Pm, driving of the electric motor 36 is stopped, and driving of the starter 29 is started. Thereafter, when the rotational speed of the engine exceeds 400 rpm, driving of the starter 29 is stopped, and driving of the electric motor 36 is started once again.

While the fuel pressure is below the predetermined pressure, a fuel injection amount is insufficient and atomization of the fuel is unsatisfactory. In such a case, satisfactory combustion cannot be achieved even when the engine is rotated by the starter 29. However, by delaying the driving of the starter 29 until the predetermined fuel pressure is attained, it is possible to achieve satisfactory combustion and improve the startability of the engine.

(6) Correction of Injecting Time Period Based on Cylinder Pressure

Correction of an injecting time period based on a pressure in the combustion chamber 15 (hereinafter, this pressure will be referred to as a cylinder pressure) will be described. As shown in FIG. 14B, the pressure in the combustion chamber 15 is substantially constant during the intake stroke and is successively increased during the compression stroke. At a midpoint in the compression stroke, the fuel is ignited. A fuel injection amount to be injected into the combustion chamber 15 through the fuel injection valve 45 is influenced by a pressure Pc in the combustion chamber 15 (hereinafter, this pressure will be referred to as injection time cylinder pressure) at the time of fuel injection. Even when the same injecting time period is used in every fuel injection, the following things happen. That is, a relatively large fuel injection amount is injected during the intake stroke and the first half of the compression stroke, in which the injection time cylinder pressure Pc is relatively low, and a relatively small fuel injection amount is injected during the second half of the compression stroke, in which the injection cylinder Pc is relatively high. Hence, in order to achieve highly accurate injection into the combustion chamber 15, it is preferable to correct the injecting time period based on the injection time cylinder pressure Pc.

Figure 14A:
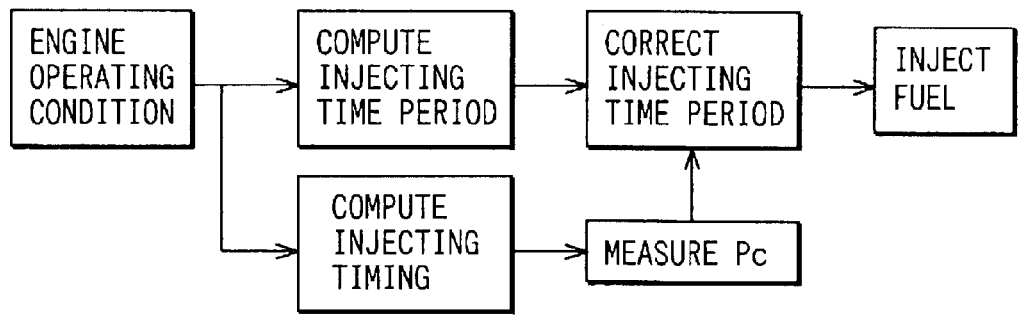
FIG. 14A is a schematic view showing correction of injecting time period based on a cylinder pressure.
Figure 14B:
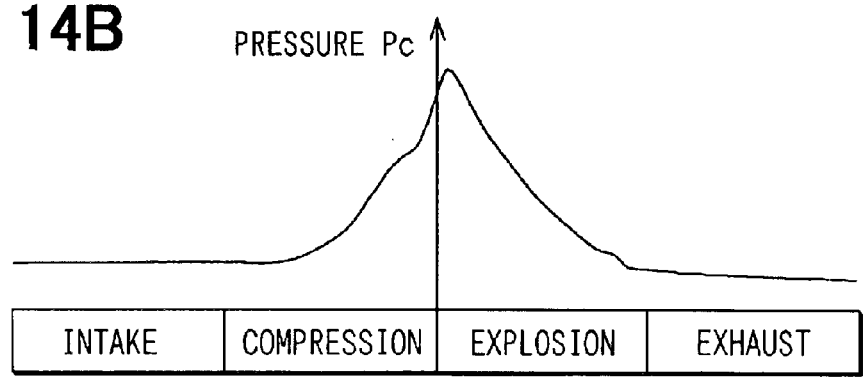
FIG. 14B is a schematic view showing relationship between a cylinder pressure and time.

More specifically, as shown in FIG. 14A, the ECU 32 determines the injecting time period and the injecting timing based on the operating condition of the engine. The injection time cylinder pressure Pc in the combustion chamber 15 is measured by a pressure detecting means, such as a cylinder pressure sensor, and the measured pressure is inputted to the ECU 32. Then, the injecting time period, i.e., a valve opening time period of the fuel injection valve 45 is corrected to be shorter when the measured injection time cylinder pressure Pc is relatively low. Furthermore, the injecting time period, i.e., the valve opening time period of the fuel injection valve 45 is corrected to be longer when the measured injection time cylinder pressure Pc is relatively high. By correcting the injecting time period based on the injection time cylinder pressure Pc in this manner, a fuel injection amount corresponding to the injection time cylinder pressure Pc can be injected.

The injection time cylinder pressure Pc can be determined using a mathematical function, which is predetermined based on the injecting timing and an amount of the gas mixture filled in the combustion chamber 15 or an amount of intake air. Alternatively, the injection time cylinder pressure Pc can be determined using a map, which is prepared in advance based on the fuel injecting timing.

Alternatively, highly accurate cylinder injection can be achieved by correcting a set fuel pressure Pf based on the injection time cylinder pressure Pc without correcting the injecting time period as described above. More specifically, a fuel injection amount is proportional to a square root of a difference (Pf−Pc) between the set fuel pressure Pf and the injection time cylinder pressure Pc. Thus, the injection time cylinder pressure Pc is computed by the aforementioned method. The square root of (Pf−Pc) is kept constant by giving a higher set fuel pressure Pf when the injection time cylinder pressure Pc is relatively high and by giving a lower set fuel pressure Pf when the injection time cylinder pressure Pc is relatively low. Even in this way, a fuel injection amount corresponding to the injection time cylinder pressure Pc can be injected.

The above embodiment can be summarized as follows.

(Electric Pump Unit)

The electric pump unit 35 can include one electric motor 36 and one fuel pump 37. Alternatively, the electric pump unit 35, 50, 63 can include one or two electric motors 36, 51, 57, 60 and one or two fuel pumps 37, 52, 54, 58, 61.

Driving operation of the electric pump unit 35, 50, 63 with power supplied from the battery 74 is as follows. At the engine start-up, the electric pump unit 35, 50, 63 can be driven before activation of the starter 29. In order to achieve this, firstly, when the ignition key 33 is inserted into the ignition switch 75, power of the battery 74 can be used only for driving the electric pump unit 35, 50, 63 until the ignition key 33 is turned to the start position. Secondary, after the positioning of the ignition key 33 to the start position, power of the battery 74 can be used for driving both the electric pump unit 35, 50, 63 and the electric motor (starter) 29 for starting the engine until a rotational speed of the engine reaches a predetermined value. Thirdly, after the positioning of the ignition key 33 to the start position, power of the battery 74 can be used substantially only for driving the starter 29 until a fuel pressure in the corresponding combustion chamber 15 reaches a predetermined value.

It is preferable that the rotational speed of the electric pump unit 35, 50, 63 and the rotational speed of the engine are not synchronized.

(Fuel Injection Valve)

The nozzle 46 of each fuel injection valve 45 includes the injection holes 47a, 47b. The injection holes 47a, 47b can be oriented such that fuel is injected through the injection holes 47a, 47b and thus distributed throughout the interior of the combustion chamber 15. Alternatively, the injection holes 47a, 47b can be oriented such that fuel is injected through the injection holes 47a, 47b and thus distributed over the top surface of the piston 12 and to the exhaust valves 17. Further alternatively, the injection holes 47a, 47b can be oriented such that fuel is injected through the injection holes 47a, 47b and thus distributed to the top surface of the piston 12 and to the ignition plug 23. In any of these cases, it is desirable that each fuel injection valve 45 is secured to the lateral side portion of the engine main body 10 and extends generally in the oblique direction relative to the axial direction of the corresponding cylinder bore 11.

Further alternatively, the injection holes 47a, 47b can be oriented such that fuel is injected through the injection holes 47a, 47b and thus uniformly distributed over the top surface of the piston 12. In such a case, it is desirable that each fuel injection valve 45 is secured to the top portion of the engine main body 10 and extends in the axial direction of the corresponding cylinder bore 11. Furthermore, a heater (not shown) can be arranged in the fuel injection valve 45 to heat the injection nozzle 46 to a relatively high temperature to promote evaporation of the gas mixture.

The set fuel pressure of the fuel injection valve 45 is as follows. In the case of the present invention where only one electric pump unit 35, 50, 63 is used, when 5–14 MPa is used as the fuel pressure like in the case the previously proposed mechanical pump, it might cause problems in terms of efficiency, durability, a pump size, driving energy, etc. of the electric pump. Hence, the minimum possible fuel pressure, which allows maintenance of the desired engine performance, is used in the present invention. It should be noted, however, that since the fuel is directly injected into the combustion chamber 15 (cylinder bore 11) through the fuel injection valve 45, the fuel injection pressure has to be greater than a pressure in the combustion chamber 15 measured during the compression stroke.

More specifically, a general compression ratio of a gasoline engine is about 20. When the air of 0.1 MPa is suctioned and is compressed about ten times, the pressure in the corresponding combustion chamber reaches about 1 MPa. Thus, when the fuel pressure is equal to or greater than this pressure, the fuel can be injected into the combustion chamber even during the compression stroke. Because of this, 1 MPa is chosen as the minimum set fuel pressure (cylinder pressure during the compression stroke) of the high pressure electric pump in the present exemplary embodiments.

Figure 8A:
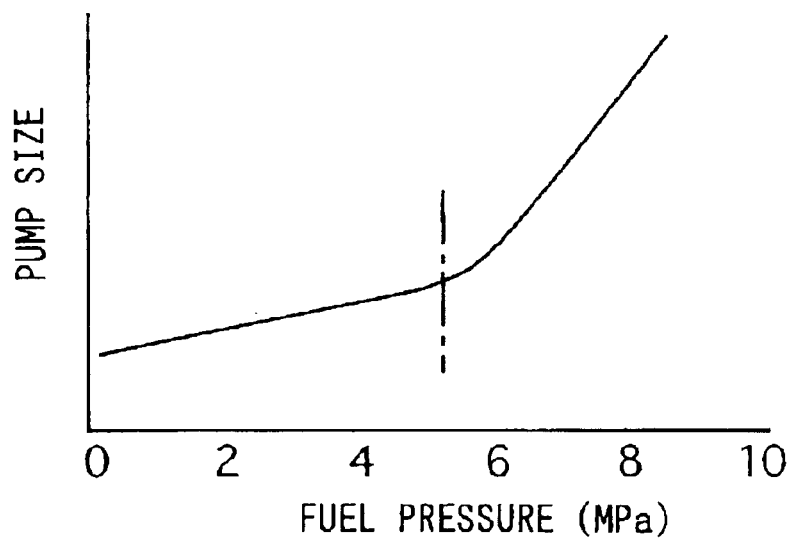
FIG. 8A is a graph showing relationship between a fuel pressure and a pump size of the electric pump unit.
Figure 8B:
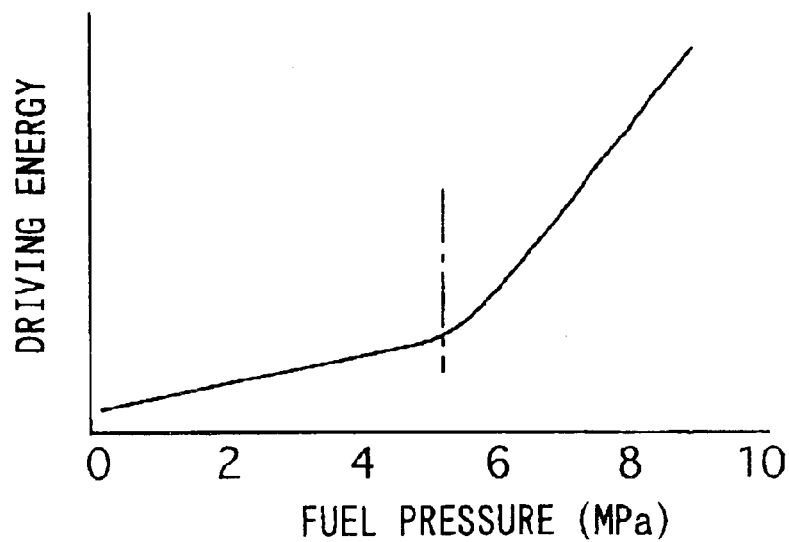
FIG. 8B is a graph showing relationship between a fuel pressure and a driving energy of the electric pump unit.

FIG 8A is a graph showing relationship between a pump size and a set fuel pressure of the electric pump unit, and FIG. 8B is a graph showing relationship between a driving energy and a set fuel pressure of the electric pump unit. These graphs show that both the pump size and the driving energy increase significantly when the fuel pressure exceeds 5 MPa. In consideration of the foregoing, 5 MPa is chosen as the upper limit of the set fuel pressure in the present exemplary embodiments.

The engine performance can be improved by allowing variation of the fuel pressure in a range of 1 to 5 MPa based on the operating condition of the engine. Also, it is preferable to use a relatively high fuel pressure (set fuel pressure) at each time of engine start-up, time of high load and high rotational speed operation of the engine (i.e. time of operating the engine at a relatively high load and at a a relatively high rotational speed), and time of cold operation of the engine where a relatively large amount of fuel needs to be injected, and atomization of the fuel is required. Other than these states, it is preferable to use a relatively low fuel pressure.

Furthermore, the set fuel pressure at the fuel injection through the fuel injection valve can be varied based on a pressure in the combustion chamber at the injection. Also, a fuel injecting time period can be corrected based on the pressure in the combustion chamber.

(Piping Arrangement)

The piping arrangement 40–42 preferably includes the fuel line 40, which extends from the electric pump unit 35, 50, 63 to the engine main body 10, and the delivery line 42, which distributes the fuel to the respective combustion chambers 15 of the engine main body 10. No pressurizing mechanism is provided in the piping arrangement 40–42. Here, "no pressurizing mechanism" means absence of a pumping means (regardless of whether it is an electrical type or a mechanical type) or the like for raising the fuel pressure.

In a case where the connecting portion 41 between the fuel line 40 and the respective fuel injection valves 45 is rigid, it is preferable that the connecting portion 41 is arranged parallel to the output shaft (i.e., the axial direction X of the output shaft) of the engine. On the other hand, in a case where the connecting portion is flexible, the connecting portion can extend parallel to the output shaft of the engine or can extend in a direction perpendicular to the output shaft of engine.

(Other Components)

(1) Supercharger

A supercharger 76 is connected to the intake side of the engine main body 10, and the set fuel pressure of each fuel injection valve 45 can vary in a range of 1 to 5 MPa depending on a supercharged pressure of the supercharger 76.

(2) Fuel Pressure Sensor and ECU

The fuel pressure sensor 43, 67 can be provided in the fuel line 40 or the delivery line 42 in close proximity to the fuel injection valves 45 (i.e., at least one of the fuel injection valves 45). A fuel pressure at the outlet 39, 71, 73 of the electric pump unit 35, 50, 63 can be estimated based on the measurement of the fuel pressure sensor 43, 67. A rotational speed of the electric pump unit 35, 50, 63 can be controlled by the ECU 32 based on the estimated fuel pressure. The estimation of the fuel pressure at the outlet 39, 71, 73 of the electric pump unit 35, 50, 63 can be performed by storing of a predetermined estimating equation in the ECU 32 or by storing estimated values in the ECU 32. The estimated values can be obtained through simulations each performed using a model of the fuel line 40 and the delivery line 42.

Also, the fuel pressure sensor 65, 68 can be provided at the outlet 39, 71, 73 of the electric pump unit 35, 50, 63. A fuel pressure near the fuel injection valves 45 can be estimated based on the measurement of the fuel pressure sensor 65, 68 provided at the outlet 39, 71, 73 of the electric pump unit 35, 50, 63. Then, a driving time period of the fuel injection valve 45 can be controlled by the ECU 32 based on the estimated fuel pressure.

Further, the first fuel pressure sensor 67 can be provided adjacent to the fuel injection valves 45 (or at least one of the fuel injection valves 45), and the second fuel pressure sensor 68 can be provided at the outlet 39, 71, 73 of the electric pump unit 35, 50, 63. In this case, the ECU 32 computes a driving time period of the fuel injection valve 45 based on the measurement of the first fuel pressure sensor 67. Then, the ECU computes expected electric power that needs to be supplied to the electric pump unit 35, 50, 63. Then, the ECU 32 corrects the computed electric power based on the measurement of the second fuel pressure sensor 68.

Additional advantages and modifications will readily occur to those skilled in the art. The invention in its broader terms is therefore, not limited to the specific details, representative apparatus, and illustrative examples shown and described.

What is claimed is:

1. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein each nozzle includes a plurality of injection holes, which are oriented to uniformly inject the fuel over an entire top surface of a corresponding one of the pistons.

2. A fuel supply and injection system according to claim 1, wherein the electric pump unit includes one electric motor and one fuel pump driven by the electric motor.

3. A fuel supply and injection system according to claim 1, wherein the electric pump unit includes one or two electric motors and one or two fuel pumps driven by the one or two electric motors.

4. A fuel supply and injection system according to claim 1, wherein a set fuel pressure of each fuel injection valve is in a range of 1 to 5 MPa.

5. A fuel supply and injection system according to claim 1, wherein each fuel injection valve is constructed such that a fuel injecting time period of each fuel injection valve is corrected based on a pressure in the corresponding one of the combustion chambers when the fuel is injected from each fuel injection valve.

6. A fuel supply and injection system according to claim 1, wherein:
- the piping arrangement includes a fuel line and a delivery line;
- the fuel line extends from the electric pump unit to the engine main body; and
- the delivery line distributes the fuel, which is supplied through the fuel line, to each fuel injection valve.

7. A fuel supply and injection system according to claim 6, wherein the piping arrangement further includes a connecting portion, which connects between the fuel line and the delivery line and is made of a flexible material.

8. A fuel supply and injection system according to claim 1, wherein a rotational speed of the electric pump unit is not synchronized with a rotational speed of the engine.

9. A fuel supply and injection system according to claim 1, wherein:
- the engine is driven by a starter, which is powered from a battery of the vehicle, at start-up of the engine; and
- the electric pump unit is driven before the starter is driven at the start-up of the engine.

10. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:
- a single electric pump unit, which is provided in the fuel tank and includes an inlet for taking the fuel in the fuel tank and an outlet for discharging the fuel;
- a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and
- a piping arrangement, which connects between the outlet of the electric pump unit and each fuel injection valve, wherein the single electric pump unit is the only pump for supplying the fuel to the fuel injection valves;
- wherein each fuel injection valve is secured to a top portion of the engine main body in such a manner that each fuel injection valve extends generally in an axial direction of a corresponding one of the cylinder bores.

11. A fuel supply and injection system according to claim 10, wherein each fuel injection valve is secured to a lateral side portion of the engine main body in such a manner that each fuel injection valve extends generally in an oblique direction relative to an axial direction of a corresponding one of the cylinder bores.

12. A fuel supply and injection system
for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:
- a single electric pump unit, which is provided in the fuel tank and includes an inlet for taking the fuel in the fuel tank and an outlet for discharging the fuel;
- a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and
- a piping arrangement, which connects between the outlet of the electric pump unit and each fuel injection valve, wherein the single electric pump unit is the only pump for supplying the fuel to the fuel injection valves;
- wherein:
- the engine main body further includes a plurality of exhaust valves, each of which is disposed in a corresponding one of the combustion chambers;
- each nozzle includes a plurality of injection holes;
- at least one of the injection holes of each nozzle is oriented to inject the fuel to a top surface of a corresponding one of the pistons; and
- at least another one of the injection holes of each nozzle is oriented to inject the fuel to a corresponding one of the exhaust valves.

13. A fuel supply and injection system
for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:
- a single electric pump unit, which is provided in the fuel tank and includes an inlet for taking the fuel in the fuel tank and an outlet for discharging the fuel;
- a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and
- a piping arrangement, which connects between the outlet of the electric pump unit and
- each fuel injection valve, wherein the single electric pump unit is the only pump for supplying the fuel to the fuel injection valves;
- wherein:
- the engine main body further includes a plurality of ignition plugs, each of which is disposed in a corresponding one of the combustion chambers;
- each nozzle includes a plurality of injection holes;
- at least one of the injection holes is oriented to inject the fuel to a top surface of a corresponding one of the pistons; and
- at least another one of the injection holes is oriented to inject the fuel to a corresponding one of the ignition plugs.

14. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein a set fuel pressure of each fuel injection valve is variable within a range of 1 to 5 MPa depending on an operating condition of the engine.

15. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:

a set fuel pressure of each fuel injection valve is in a range of 1 to 5 MPa;

the set fuel pressure of each fuel injection valve is relatively high at each of time of start-up of the engine, time of high load and high rotational speed operation of the engine and time of cold operation of the engine; and the set fuel pressure of each fuel injection valve is relatively low at other than the time of the start-up of the engine, the time of high load and high rotational speed operation of the engine and the time of cold operation of the engine.

16. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:

the engine main body includes a supercharger, which is connected to an intake side of the engine main body; and a set fuel pressure of each fuel injection valve is variable within a range of 1 to 5 MPa depending on a supercharged pressure of the supercharger.

17. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein a set fuel pressure of each fuel injection valve is variable depending on a pressure in the corresponding one of the combustion chambers when the fuel is injected from each fuel injection valve.

18. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:

the piping arrangement includes a fuel line and a delivery line;

the fuel line extends from the electric pump unit to the engine main body;

the delivery line distributes the fuel, which is supplied through the fuel line, to each fuel injection valve; and the engine main body further includes an output shaft; and the piping arrangement further includes a connecting portion, which connects between the fuel line and the delivery line and extends generally parallel to the output shaft of the engine main body.

19. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

a fuel pressure sensor, which is arranged adjacent to at least one of the fuel injection valves, wherein:

the electric pump unit includes at least one electric motor and at least one fuel pump driven by the at least one electric motor; and a rotational speed of each of the at least one fuel pump is controlled based on an estimated fuel pressure at the outlet of the electric pump unit, wherein the estimated fuel pressure at the outlet of the electric pump unit is estimated based on a measurement of the fuel pressure sensor.

20. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

a fuel pressure sensor, which is arranged at the outlet of the electric pump unit, wherein:

a driving time period of each fuel injection valve is controlled based on an estimated fuel pressure at a point adjacent to at least one of the fuel injection valves; and the estimated fuel pressure at the point adjacent to the at least one of the fuel injection valves is estimated based on a measurement of the fuel pressure sensor.

21. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

a first fuel pressure sensor, which is arranged adjacent to at least one of the fuel injection valves; and a second fuel pressure sensor, which is arranged at the outlet of the electric pump unit, wherein:

a driving time period of each fuel injection valve is computed based on a measurement of the first fuel pressure sensor; and expected electric power, which needs to be supplied to the electric pump unit from a battery of the vehicle, is corrected based on a measurement of the second fuel pressure sensor.

22. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:
the engine is driven by a starter, which is powered from a battery of the vehicle, at start-up of the engine;
the electric pump unit is driven before the starter is driven at the start-up of the engine; and
the electric pump unit is powered from the battery of the vehicle in such a manner that electric power from the battery is used substantially only for driving the electric pump unit after insertion of an ignition key to an ignition switch of the vehicle until the ignition key is rotated to a start position.

23. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:
the engine is driven by a starter, which is powered from a battery of the vehicle, at start-up of the engine;
the electric pump unit is driven before the starter is driven at the start-up of the engine; and
the electric pump unit is powered from the battery of the vehicle in such a manner that electric power from the battery is used for driving both the electric pump unit and the starter after positioning of an ignition key to a start position until a rotational speed of the engine reaches a predetermined value.

24. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:
the engine is driven by a starter, which is powered from a battery of the vehicle, at start-up of the engine;
the electric pump unit is driven before the starter is driven at the start-up of the engine; and
the electric pump unit is powered from the battery of the vehicle in such a manner that electric power from the battery is used substantially only for driving the starter after positioning of an ignition key to a start position until a fuel pressure in at least one of the combustion chambers reaches a predetermined value.

25. A fuel supply and injection system for a vehicle equipped with an engine supplied with fuel from a vehicle fuel tank, wherein the engine has an engine main body, which includes a plurality of cylinder bores and a plurality of pistons, and each piston is received in a corresponding one of the cylinder bores and defines a combustion chamber in the corresponding one of the cylinder bores, the fuel supply and injection system comprising:

a single electric pump unit, which is provided in the fuel tank and includes an inlet for taking the fuel in the fuel tank and an outlet for discharging the fuel;

a plurality of fuel injection valves, which are secured to the engine main body, wherein each fuel injection valve includes a nozzle, which is disposed in a corresponding one of the combustion chambers and injects the fuel supplied from the electric pump unit directly into the corresponding one of the combustion chambers; and a piping arrangement, which connects between the outlet of the electric pump unit and each fuel injection valve, wherein the single electric pump unit is the only pump for supplying the fuel to the fuel injection valves;

wherein:
the engine is driven by a starter, which is powered from a battery of the vehicle, at start-up of the engine;
the electric pump unit is driven before the starter is driven at the start-up of the engine; and
the electric pump unit is powered from the battery of the vehicle in such a manner that electric power from the battery to the electric pump unit is reduced or stopped when a fuel pressure of the fuel pumped from the electric pump unit reaches a predetermined value.

26. A method for controlling a fuel supply and injection system for an engine of a vehicle, the method comprising:

supplying electric power from a battery of the vehicle to an electric pump unit at time of start-up of the engine to drive the electric pump unit for pumping fuel from a fuel tank to a plurality of injection valves through a piping arrangement;

supplying electric power from the battery to a starter to drive the starter for starting the engine; and reducing the electric power supplied from the battery to the electric pump unit when the electric power is supplied from the battery to the starter to drive the starter.

27. A method for controlling a fuel supply and injection system for an engine of a vehicle, the method comprising:

supplying electric power from a battery of the vehicle to an electric pump unit at time of start-up of the engine to drive the electric pump unit for pumping fuel from a fuel tank to a plurality of injection valves through a piping arrangement; and supplying electric power from the battery to a starter to drive the starter for starting the engine; wherein:

the supplying electric power from the battery of the vehicle to the electric pump unit is initiated when an ignition key is inserted into an ignition switch; and the supplying of the electric power from the battery to the starter is initiated when the ignition key is rotated to a start position.

28. A method for controlling a fuel supply and injection system for an engine of a vehicle, the method comprising:

supplying electric power from a battery of the vehicle to an electric pump unit at time of start-up of the engine to drive the electric pump unit for pumping fuel from a fuel tank to a plurality of injection valves through a piping arrangement; and supplying electric power from the battery to a starter to drive the starter for starting the engine;

wherein the supplying of the electric power from the battery to the starter includes stopping of the supplying of the electric power from the battery to the electric pump unit.

29. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston.

30. A method as in claim 29 wherein the electric pump unit includes one electric motor and one fuel pump driven by the electric motor.

31. A method as in claim 29 wherein the electric pump unit includes one or two electric motors and one or two fuel pumps driven by the one or two electric motors.

32. A method as in claim 29 wherein a set fuel pressure of each fuel injection valve is in a range of 1 to 5 MPa.

33. A method as in claim 29 wherein each fuel injection valve is constructed such that a fuel injecting time period of each fuel injection valve is corrected based on a pressure in a corresponding combustion chamber when the fuel is injected.

34. A method as in claim 29 wherein:

the connecting step includes providing a fuel line and a delivery line;

the fuel line extending from the electric pump unit to an engine main body; and the delivery line distributing fuel, which is supplied through the fuel line, to each fuel injection valve.

35. A method as in claim 34 wherein the connecting step further includes providing a connecting pipe portion, which connects between the fuel line and the delivery line and which is made of a flexible material.

36. A method as in claim 29 wherein rotational speed of the electric pump unit is not synchronized with rotational speed of the engine.

37. A method as in claim 29 wherein:

the engine is driven by a starter, which is powered from a battery of the vehicle, at start-up of the engine; and the electric pump unit is driven before the starter is driven at the start-up of the engine.

38. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein each fuel injection valve is secured to a top portion of the engine main body in such a manner that each fuel injection valve extends generally in an axial direction of a corresponding cylinder bore.

39. A method as in claim 38 wherein each fuel injection valve is secured to a lateral side portion of an engine main body in such a manner that each fuel injection valve extends generally in an oblique direction relative to an axial direction of a corresponding cylinder bore.

40. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

each fuel injection valve includes a nozzle having a plurality of injection holes with at least one of the injection holes oriented to inject the fuel to a top surface of a corresponding piston and at least another injection hole oriented to inject fuel to a corresponding exhaust valve.

41. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

each fuel injection valve includes a nozzle having a plurality of injection holes with at least one injection hole oriented to inject fuel to a top surface of a corresponding piston and at least another injection hole oriented to inject fuel to a corresponding ignition plug.

42. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein a set fuel pressure of each fuel injection valve is variable within a range of 1 to 5 MPa depending on an operating condition of the engine.

43. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

a set fuel pressure of each fuel injection valve is in a range of 1 to 5 MPa;

the set fuel pressure of each fuel injection valve is relatively high at each of (a) time of start-up of the engine, (b) time of high load and high rotational speed of the engine and (c) time of cold operation of the engine.

44. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein a set fuel pressure of each fuel injection valve is variable within a range of 1 to 5 MPa depending on a supercharged pressure of a supercharger.

45. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein a set fuel pressure of each fuel injection valve is variable depending on a pressure in a corresponding combustion chamber when fuel is injected from each fuel injection valve.

46. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

the connecting step includes providing a fuel line and a delivery line;

the fuel line extending from the electric pump unit to an engine main body; and the delivery line distributing fuel, which is supplied through the fuel line, to each fuel injection valve; and wherein:

the connecting step further includes providing a connecting pipe portion, which connects between the fuel line and the delivery line and which extends generally parallel to an output shaft of an engine main body.

47. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and controlling a rotational speed of at least one fuel pump based on an estimated fuel pressure at an electric pump unit outlet, wherein the estimated fuel pressure is estimated based on a measurement of fuel pressure near at least one fuel injection valve.

48. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and controlling a driving time period of each fuel injection valve based on an estimated fuel pressure at a point adjacent to at least one of the fuel injection valves that is estimated based on a measurement of fuel pressure near the outlet of the electric pump unit.

49. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and computing a driving time period for each fuel injection valve based on a measurement of fuel pressure near at least one fuel injection valve and correcting the supply of electric power to the electric pump unit from a battery of the vehicle based on a measurement of fuel pressure near an outlet of the electric pumping unit.

50. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

the engine is driven by a starter, which is powered from a battery of the vehicle, at start-up of the engine; and the electric pump unit is driven before the starter is driven at the start-up of the engine;

wherein the electric pump unit is powered from a battery of the vehicle in such a manner that electric power from the battery is used substantially only for driving the electric pump unit after insertion of an ignition key to an ignition switch of the vehicle until the ignition key is rotated to a start position.

51. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

the engine is driven by a starter, which is powered from a battery of the vehicle, at start-up of the engine; and the electric pump unit is driven before the starter is driven at the start-up of the engine;

wherein the electric pump unit is powered from a battery of the vehicle in such a manner that electric power from the battery is used for driving both the electric pump unit and the starter after positioning of an ignition key to a start position until a rotational speed of the engine reaches a predetermined value.

52. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

the engine is driven by a starter, which is powered from a battery of the vehicle, at start-up of the engine; and the electric pump unit is driven before the starter is driven at the start-up of the engine;

wherein the electric pump unit is powered from a battery of the vehicle in such a manner that electric power from the battery is used substantially only for driving the starter after positioning of an ignition key to a start position until a fuel pressure in at least one of the combustion chambers reaches a predetermined value.

53. A method for supplying fuel to a fuel injected engine of a vehicle, said method comprising:

providing a single electric pump unit in a fuel tank; and connecting an outlet of the electric pump unit to each fuel injection valve of the engine, wherein the single electric pump unit is the only pump used for supplying fuel to the fuel injection valves;

wherein each fuel injection valve includes a nozzle having a plurality of injection holes oriented to uniformly inject fuel over an entire top surface of a corresponding piston; and wherein:

the engine is driven by a starter, which is powered from a battery of the vehicle, at start-up of the engine; and the electric pump unit is driven before the starter is driven at the start-up of the engine;

wherein the electric pump unit is powered from a battery of the vehicle in such a manner that electric power from the battery to the electric pump unit is reduced or stopped when fuel pressure of fuel pumped from the electric pump unit reaches a predetermined value.

* * * * *